Nov. 13, 1951     F. LOPOLITO     2,575,281
INJECTION SYRINGE
Filed June 28, 1950
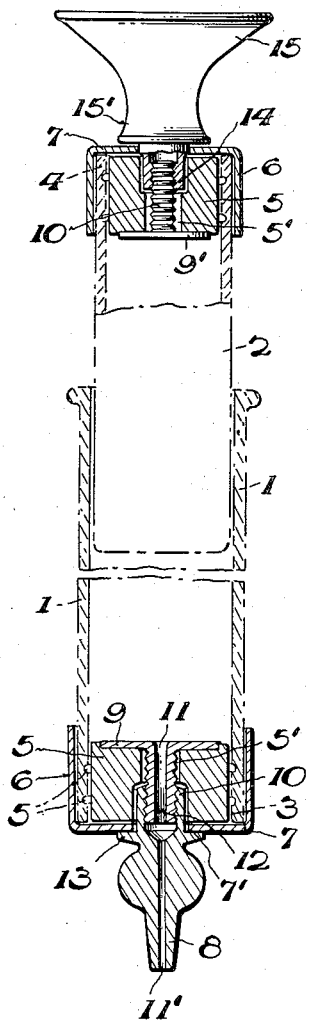
INVENTOR
*Francisco Lopolito.*
BY
*Emery L. Groff*
ATTORNEY Patented Nov. 13, 1951

2,575,281

UNITED STATES PATENT OFFICE 2,575,281

INJECTION SYRINGE

Francisco Lopolito, Buenos Aires, Argentina

Application June 28, 1950, Serial No. 170,770
In Argentina April 5, 1950

2 Claims. (Cl. 128—220)

The present invention refers to injection-syringes improved as the outcome of constant and repeated practical experiments and based on the incorporation of novel and efficient constructional features ensuring correct and precise operation and unlimited usefulness.

As will be recognized, injection syringes known and used to date consist of a tube, functioning as a receiver containing the product, and equipped with a small pointed outlet. This tube is run through by a plunger, which is the member provided for expelling the substance held within said tube. Both the tubular receptacle as well as the plunger are of vitreous material, especially in syringes for therapeutical use, the former being integrally provided with a small, thin, frustum-shaped outlet, particularly arranged for receiving a needle.

The plunger, on the other hand, terminates in a thumb-piece enabling the necessary, axially-directed pressure to be applied in order to eject the liquid. This member, like the outlet, is subjected to the most severe usage while employing the syringe. Both parts, therefore, are of very limited duration and after a short period of use suffer breakages which make the unit totally inoperative.

The improvements constituting the object of the present application overcome these difficulties and offer a syringe the tube of which is provided with an interchangeable outlet and the plunger of which has an exchangeable thrust or thumb-piece. Such members are detachable and easily and quickly replaceable. In this manner, should the tube or plunger break, it is merely necessary to purchase replacements therefor, thus saving the cost of the other parts.

The invention likewise envisages other accessory objects that will be made clear during the course of the present description.

In order that the present invention may be more clearly understood and readily put into practice, the same will now be described with reference to the attached drawing illustrating a preferred embodiment of its principles, said embodiment to be taken as an example but in no way as a limitation upon the invention.

The single figure of the drawing shows an injection syringe provided with parts according to the present invention.

In accordance with the drawing attached, said syringe, as usual, consists of a tubular receptacle 1 and a plunger 2. Both these members are structurally somewhat modified as compared with known constructions. In fact, in the present case, the tube or receptacle has no end-limiting wall and no corresponding integral outlet closed by edge 3.

In order to be able to assemble the missing members means for adjusting the respective parts have been provided, at one or both ends. In the case of tubular receptacle 1 these means consist of a resilient member 5 axially perforated at 5' and tightly lodged within said tube 1, close to free end 3. Outside of said end and likewise tightly adjusted a cylindrical cap 6 is furnished, provided with an annular flange 7 serving as a front retention member for resilient part 5. Opening 7' of said flange coincides with the perforation provided in the aforementioned member.

This resilient part and its member 6 comprise the aforesaid adjustment means, the first-mentioned forming a hermetic seal at the free end 3 of tube 1. Both parts, however, serve to receive a detachable outlet 8 which is threaded onto a support compression member consisting of a disc 9 and a stem 10 perforated at 11.

The aforementioned stem is provided with an outside thread and passes partially through opening 5' of member 5 permitting interiorly-threaded tubular extension 12 to screw on to stem 10. A retention ring 13 limits the passage of the outlet through orifices 7' and 5'.

As will be seen when arranging the outlet in the manner described, disc 9 presses against the corresponding surface of member 5, causing the same to expand radially and thus press strongly against the interior surface of tube 1. Strong adherence between both surfaces is thus obtained, further increased by a series of thread-like projections 5'' arranged on the outer periphery of said member.

Evidently, when injecting the liquid contained in 1 by means of plunger 2, said liquid is expelled through openings 11 and 11', leaving through the needle which is pressure-fixed against frustum-shaped outlet 8. The sealing quality of the contact surfaces of both adjustment members mentioned is such that the liquid in question can at no time escape therethrough.

In order to disassemble the parts and members mentioned, it is merely required to unthread outlet 8 as, once this is accomplished, all the parts in question will yield from their position of hermetically sealing pressure, it then being possible easily to uncouple tubular receptacle 1.

Another of the advantages of this system consists in that, even in the supposed case that the edge or the terminal portion of tube 1 itself be damaged or broken, provided said breakage does not extend beyond the free edge of member 6, said receptacle can continue to be used without any fear that its hermetic sealing qualities will be adversely affected while the syringe is being used. This quality is due to the fact that resilient member 5 adheres strongly to the remainder of said terminal portion, and no loss of liquid can take place.

Outlet 8 should be of metal or similar material guaranteeing unlimited duration. In the same way, cap member 6 and disc 9 with stem 10 should also be of a similar material, strong enough to resist the high pressures to which said parts are subjected.

With regard to the improvement of plunger 2, which is to be equipped with a pressure or thumb piece, the same is provided, in the same manner as tube 1, with a resilient member 5 adjusted at its free end 4. A metal disc 9' has a threaded stem, 10', which passes through aperture 5', and which effects adjustment of a threaded extension 14 of a thumb piece 15 a widened ring-shaped portion of which (15') rests against flange 7 of a second cap member 6.

The plunger is thus provided with a metal or similar element 15 capable of permitting the application of intense pressure to the plunger without fear of easy breakage.

It is evident that said adjustment parts may be applied and adapted to tubes and plungers of any material. Their main object, however, consists in providing the same for application to tubes and plungers of glass or similar material, particularly in the case of the plunger inasmuch as plungers of other material are usually equipped with metal clamps.

The invention as described may be clearly understood and no further explanations will be required by those versed in the matter.

As the present description has been made with particular reference to a preferred embodiment which is to be considered as an example only, it is evident that changes may be introduced without thereby departing from the scope of the invention, as defined in the following claims.

I claim:

1. In an improved injection syringe, the combination, comprising, an open-ended tube, a cap member surrounding one end portion of the tube and including a flange partially closing that end of the tube and having a central aperture, a needle member engaging the flange and including a tapped stem inserted through the aperture, a resilient sealing member in an unstressed state insertible in the end of the tube surrounded by the cap member and having a central bore registering with the aperture and receiving the stem of the needle member, a disc member of a diameter fitting into the tube and having a tapped stem extending into the bore and threadedly engaging the needle stem, said disc pressing the sealing member against the tube and the flange of the cap member, a tubular plunger slidable in the tube and having a closed end, a second cap member surrounding the other plunger end and including a flange partially closing the other plunger end and having a second central aperture, a thumbpiece bearing against the flange of the second cap member and having a tapped stem inserted through the flange aperture, a second sealing member of a diameter fitting it in an unstressed state into the plunger end adjacent the flange of the second cap member and having a second central bore registering with the second aperture, a second disc member bearing against the second sealing member and including a tapped stem extending into the second bore and threadedly engaging the stem of the thumbpiece.

2. The combination according to claim 1, and wherein the sealing members have on their peripheries thread-like projections.

FRANCISCO LOPOLITO.

REFERENCES CITED

The following references are of record in the file of this patent:

UNITED STATES PATENTS

| Number | Name | Date |
|---|---|---|
| 1,578,517 | Hein | Mar. 30, 1926 |
| 1,600,587 | Hein | Sept. 21, 1926 |
| 1,643,531 | Wolf | Sept. 27, 1927 |